United States Patent
Ion et al.

(10) Patent No.: US 7,973,495 B2
(45) Date of Patent: Jul. 5, 2011

(54) ADAPTIVE CONTROL APPARATUS AND METHOD FOR A SOLID STATE LIGHTING SYSTEM

(75) Inventors: Toma Ion, Richmond (CA); Shahriar Mohammadi, Coquitlam (CA); Bojana Bjeljac, Burnaby (CA); Paul Jungwirth, Burnaby (CA)

(73) Assignee: Koninklijke Philips Electronics N.V., Eindhoven (NL)

( * ) Notice: Subject to any disclaimer, the term of this patent is extended or adjusted under 35 U.S.C. 154(b) by 472 days.

(21) Appl. No.: 12/282,551

(22) PCT Filed: Mar. 12, 2007

(86) PCT No.: PCT/CA2007/000397
§ 371 (c)(1),
(2), (4) Date: Sep. 17, 2008

(87) PCT Pub. No.: WO2007/104146
PCT Pub. Date: Sep. 20, 2007

(65) Prior Publication Data
US 2009/0058322 A1    Mar. 5, 2009

Related U.S. Application Data

(60) Provisional application No. 60/782,067, filed on Mar. 13, 2006.

(51) Int. Cl.
*H05B 37/02*    (2006.01)
*H05B 33/08*    (2006.01)

(52) U.S. Cl. .................................... 315/297; 315/307
(58) Field of Classification Search .............. 315/297, 315/291, 299, 301, 307
See application file for complete search history.

(56) References Cited

U.S. PATENT DOCUMENTS

| | | | |
|---|---|---|---|
| 4,001,667 | A |   1/1977 | Bober |
| 6,362,578 | B1 |  3/2002 | Swanson et al. |
| 6,586,890 | B2 |  7/2003 | Min et al. |
| 6,614,358 | B1 |  9/2003 | Hutchison et al. |
| 6,734,639 | B2 |  5/2004 | Chang et al. |
| 6,963,175 | B2 * | 11/2005 | Archenhold et al. ......... 315/291 |
| 7,009,580 | B2 |  3/2006 | Leung |
| 2004/0036418 | A1 |  2/2004 | Rooke et al. |

FOREIGN PATENT DOCUMENTS

| | | |
|---|---|---|
| CA | 2341657 A1 | 1/2001 |
| CA | 2519100 A1 | 3/2005 |
| CA | 2557465 A1 | 9/2005 |

* cited by examiner

*Primary Examiner* — Daniel D Chang
(74) *Attorney, Agent, or Firm* — Mark L. Beloborodov

(57) ABSTRACT

The present invention provides a method and apparatus for adaptive control of a solid-state lighting system consisting of one or more groups of one or more light-emitting elements. The invention comprises a voltage control device to provide each group with an independently controllable voltage. A feedback system to detect and generate a signal representative of drive currents through the one or more groups. A computing device then adaptively evaluates, based on the signal, a required voltage that achieves a desired respective drive current in each of the one or more groups.

18 Claims, 3 Drawing Sheets

ADAPTIVE CONTROL APPARATUS AND METHOD FOR A SOLID STATE LIGHTING SYSTEM

This application is a national stage application under 35 U.S.C. §371 of International Application No. PCT/CA2007/000397 filed on Mar. 12, 2007 and published in the English language on Sep. 20, 2007 as International Publication No. W02007/104146, which claims priority to U.S. Provisional Application Ser. No. 60/782,067 filed on Mar. 13, 2006, all of which are hereby incorporated herein by reference.

FIELD OF THE INVENTION

The present invention pertains to the field of illumination and in particular to adaptive control of operating conditions of a solid-state lighting system.

BACKGROUND

Advances in the development of light-emitting diodes (LEDs) and organic light-emitting diodes (OLEDs) are making these devices brighter, more efficient, and hence increasingly suitable in general area and space illumination applications. These devices are becoming increasingly competitive with incandescent, fluorescent, and high-intensity discharge lamps which have traditionally dominated illumination markets.

The brightness of a LED can be varied by changing the electrical current through the device. However, the amount of light any two LEDs of the same type and make emit as a consequence of the same current can differ noticeably, typically even if for example all other relevant operating conditions are the same. These undesired variations in LED operation can be reduced in several ways. For example, LEDs can be binned into groups of devices with closely matching operating characteristics or LED control circuits can be appropriately calibrated to substantially accurately control the amount of light emitted by the LEDs.

One solution for the above noted problem is to control the direct current through two or more LEDs in a linear control circuit system. A problem however, with using a linear control circuit is that it can dissipate relatively large amounts of energy which would consequently reduce the energy efficiency of the whole system.

Until single LEDs become sufficiently bright, effective area and space lighting systems will typically require many LEDs. The control of lighting devices with many LEDs can be complex. For example, dimming by reducing the drive current in direct current driven LEDs may cause LED flickering. In addition, at low current levels, some LEDs may turn OFF whereas other LEDs with lower forward voltages may remain ON. This can result in the lighting system generating undesired forms of illumination.

For example, U.S. Pat. No. 6,362,578 provides a control method wherein a feedback voltage converter is used to maintain a constant load voltage across a series of strings of LEDs wherein biasing resistors are used for current control. A transistor is connected on the low side of the LEDs and is switched with pulse width modulation (PWM) for brightness control. This configuration enables full dimming control as the current is switched and repetitively turns the LEDs ON and OFF. The time-averaged brightness of the light emitted by the LED is determined by the PWM duty cycle factor. The problem with these types of configurations, however, is that they can be inefficient due to the power losses in the biasing resistor, and may require custom resistors to accurately control the current. More energy efficient solutions may also control the voltage which is supplied to the current controller. For example, a buck-boost regulator can be used to generate a regulated common voltage supply for the high side of an LED array. Low side ballast resistors can then be used to set the LED current, and additional resistors can be used to monitor the LED drive current.

U.S. Pat. No. 4,001,667 also discloses a closed loop circuit that provides constant current pulses, however, this circuit does not allow for full duty cycle control.

U.S. Pat. No. 6,586,890 discloses a method that uses current feedback to adjust power to LEDs by PWM switching the power supply in order to adjust the brightness of the LEDs. A problem with this method is that the disclosed PWM frequency signal is within the range of about 20 Hz to 20 kHz and therefore the power supply is prone to generate audible noise. Depending on the type of LED, low switching frequencies, typically below the low $10^4$ Hz range, can also cause significant thermal cycling and induce thermal stress within the LED which can increase the risk of device failure.

U.S. Pat. No. 6,734,639 discloses a method for controlling overshoots of a switched drive circuit for LED arrays by means of a voltage converter combined with a customized sample and hold circuit. The switching signal controlling the LEDs also controls the enabling and disabling of a voltage converter and thus switches both the load (LEDs) and the supply. The signal controlling the switching of the load current is biased such that it operates the switch essentially in its linear region to be able to control the peak current which can otherwise result in power losses within the switch and reduce the overall system energy efficiency. This configuration however, typically only works for switching frequencies in the range of about 400 Hz and typically does not allow for high frequency switching of the load for example at frequencies above about 20 kHz.

In addition, U.S. Patent Application Publication No. 2004/0036418 discloses a method of driving several strings of LEDs in which a converter is used to vary the current through the LEDs. A current switch is implemented to provide feedback. This method is similar to using a standard buck converter and can provide an efficient way for controlling the current through the LEDs. A problem arises, however, when multiple LED strings require different forward voltages. In this scenario, high-side transistor switches are used as variable resistors to limit the current to a respective LED string. These high side transistor switches can induce losses and decrease the overall energy efficiency of the circuit.

Therefore, there is a need for an adaptive control method and apparatus for a solid-state lighting device that can control voltages supplied to one or more electronic devices.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide an adaptive control method and apparatus for a solid-state lighting system. In accordance with an aspect of the present invention, there is provided an adaptive control apparatus for a solid-state lighting system, the lighting system comprising one or more groups of one or more light-emitting elements, the apparatus comprising: a voltage control device operatively coupled to the one or more groups of one or more light-emitting elements, the voltage control device configured to provide each group with an independently controllable voltage; a feedback system operatively coupled to the one or more groups of one or more light-emitting elements, the feedback system configured to detect and generate a signal representative of drive currents through the one or more groups; and a computing device operatively coupled to the feedback system and configured to receive the signal, the computing device operatively coupled to the voltage control device and configured to control operation of the voltage control device; wherein the computing device is configured to adaptively evaluate, based on the signal, a required voltage that causes a desired respective drive current in each of the one or more groups.

In accordance with another aspect of the invention, there is provided a method for determining a voltage that, when applied to a system comprising a group of one or more light-emitting elements, causes a desired drive current in the group, the method comprising the steps of: evaluating a first voltage; applying the first voltage to the system; determining a first drive current; adaptively evaluating a new first voltage based on a comparison of the first drive current and the desired drive current.

DETAILED DESCRIPTION OF THE INVENTION

Definitions

Figure 1:
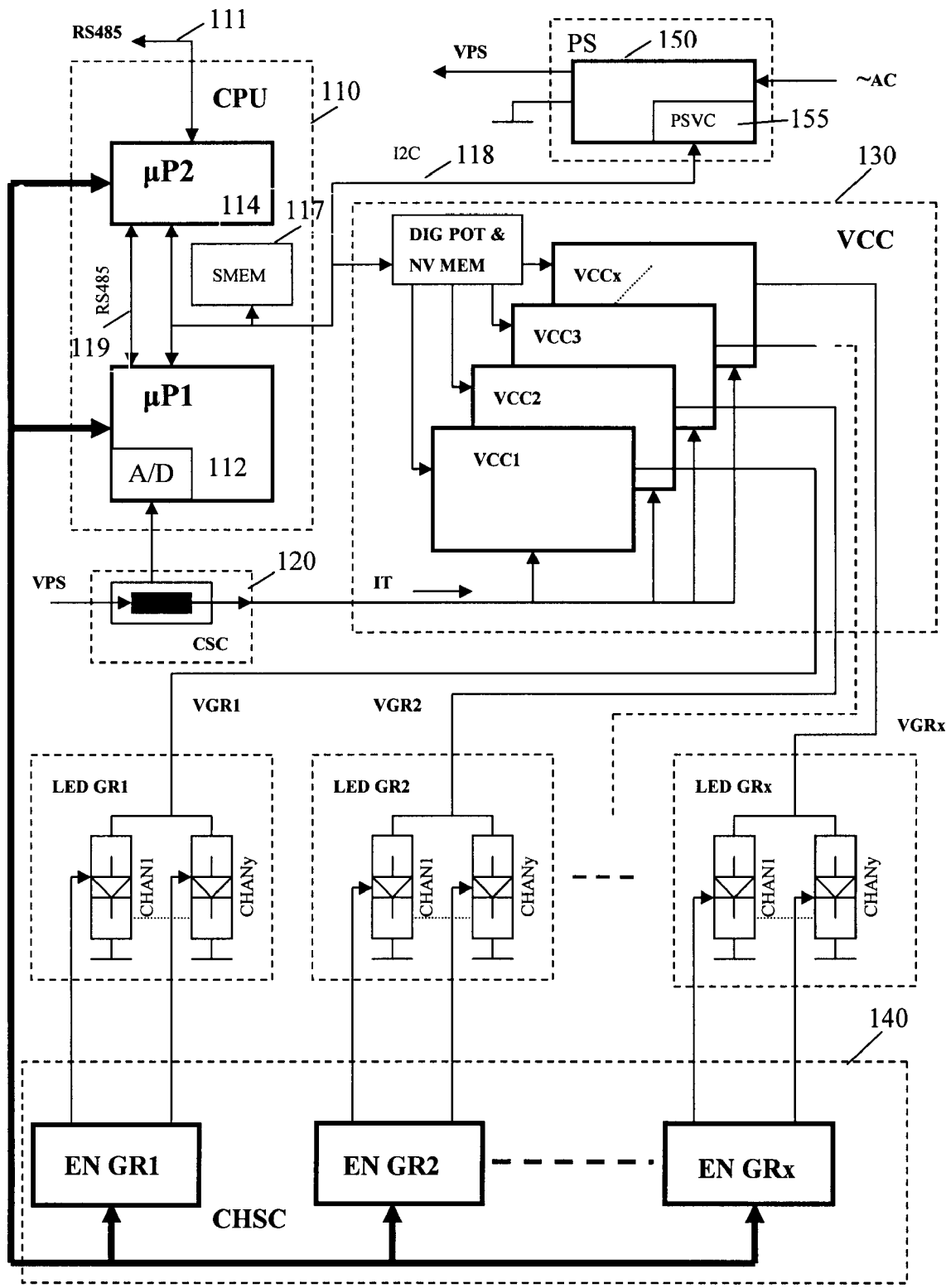
FIG. 1 illustrates an architecture of an adaptive control apparatus for a lighting device according to one embodiment of the present invention.

The term "light-emitting element" is used to define a device that emits radiation in a region or combination of regions of the electromagnetic spectrum for example, the visible region, infrared and/or ultraviolet region, when activated by applying a potential difference across it or passing an electrical current through it, for example. Therefore a light-emitting element can have monochromatic, quasi-monochromatic, polychromatic or broadband spectral emission characteristics. Examples of light-emitting elements include semiconductor, organic, or polymer/polymeric light-emitting diodes, optically pumped phosphor coated light-emitting diodes, optically pumped nano-crystal light-emitting diodes or other similar devices as would be readily understood by a worker skilled in the art.

As used herein, the term "about" refers to a +/−10% variation from the nominal value. It is to be understood that such a variation is always included in any given value provided herein, whether or not it is specifically referred to.

Unless defined otherwise, all technical and scientific terms used herein have the same meaning as commonly understood by one of ordinary skill in the art to which this invention belongs.

The present invention provides a programmable closed loop control apparatus and calibration method that can be used to determine, set, and maintain a voltage at a substantially minimum magnitude which is required to achieve a desired drive current through each of one or more groups of one or more light-emitting elements of a lighting system. In this manner, a substantially minimum voltage magnitude can be evaluated such that it is capable of achieving a desired drive current through each of the groups of one or more light-emitting elements, wherein this minimization can reduce the amount of power being drawn from a power supply and can reduce power losses in the lighting system.

The control apparatus and calibration method can periodically, randomly or on command determine the substantially minimum magnitude voltage required to achieve a desired drive current through each of the groups of one or more light-emitting elements in the lighting system. The control apparatus and calibration method can be used to mitigate variations in the performance characteristics of the light-emitting elements such as those caused by aging or replacing of light-emitting elements in the lighting system, for example. The control apparatus and calibration method can further be used in certain light-emitting element drive current control circuits that are designed to operate substantially without certain dissipative elements.

Apparatus Architecture

The control apparatus according to the present invention can provide for the control of a lighting system including one or more groups of one or more light-emitting elements. The control apparatus comprises a voltage control device which is operatively coupled to and which can control the voltage supplied to each of the one or more groups of one or more light-emitting elements. The control apparatus further comprises a feedback system which is operatively coupled to each of the one or more groups of one or more light-emitting elements and which is configured to collect information indicative of the drive current passing through each of the one or more groups of one or more light-emitting elements. In addition, the control apparatus comprises a computing device which is operatively coupled to the voltage control device, the feedback system and a source of power. The computing device is configured to control the voltage control device based on information obtained from the feedback system, in order to regulate the voltage supplied to each group of one or more light-emitting elements such that the supplied voltage generates a desired drive current through the respective group of one or more light-emitting elements.

Group of Light-Emitting Elements

Each group of one or more light-emitting elements can comprise one or more light-emitting elements in series or optionally in parallel.

In one embodiment of the present invention, a group of light-emitting elements is configured with parallel connections of two or more branches of light-emitting elements and thus may additionally require a current limiting device per branch. A current limiting device can comprise a fixed resistor, variable resistor, or transistor, for example, as would be readily understood by someone skilled in the art. The current limiting device can also comprise an operational amplifier (op-amp) operatively coupled to a transistor and a current sensing device positioned within the particular branch. The op-amp can sense the drive current in a branch and adjust the resistance of the transistor such that the drive current remains below a desired maximum. The current limiting device can be calibrated to obtain certain performance characteristics of a branch of light-emitting elements.

Voltage Control Device

The voltage control device is operatively coupled to and which can control the voltage supplied to each of the one or more groups of one or more light-emitting elements. For example, the voltage control device is configured to convert a voltage of one magnitude received from a power supply to a voltage of another magnitude, based on an input signal.

In the embodiment a power supply may be used to convert AC power to DC power for example, and the voltage control device may be a DC-to-DC converter. The DC-to-DC converter may be a step-down switch mode power supply (SMPS), such as a Buck converter, for example. A Buck converter, or other converter, may be used with standard external components such as a diode, capacitor, inductor and feedback components. Buck converters are available in standard integrated circuit (IC) packages and together with the additional external components can perform DC-to-DC conversion with an efficiency of approximately 90% or higher. Examples of other converters that can be used in place of a Buck converter include Boost converters, Buck-Boost converters, Cuk converters and Fly-Back converters.

Feedback System

The feedback system is operatively coupled to each of the one or more groups of one or more light-emitting elements and which is configured to collect information indicative of the drive current passing through each of the one or more groups of one or more light-emitting elements.

In one embodiment of the present invention, the feedback system is configured as a current sensing circuit and can have for example one or more current sensors. A current sensor provides a signal indicative of the current and it can be a resistor, for example, a fixed high precision resistor, a programmable or adjustable resistor, or a Hall Effect current sensor, or other element with a known signal-to-current relationship and which can provide a practical indication of the drive current through a group of one or more light-emitting elements.

Computing Device

The computing device is configured to control the voltage control device based on information obtained from the feedback system, in order to regulate the voltage supplied to each group of one or more light-emitting elements such that the supplied voltage generates a desired drive current through the respective group of one or more light-emitting elements.

The computing device can comprise one or more of a variety of types of microprocessors or microcontrollers including central processing units (CPUs) with or without one or more peripheral input/output interfaces. Input/output interfaces can be of a type useful for dedicated or general purpose communication or serial and/or parallel communication. The computing device can have one or more A/D converters or D/A converters for monitoring certain apparatus parameters. The computing device can include or be operatively connected to memory. The memory can be a type of storage media and can be of a volatile or non-volatile memory type such as RAM, PROM, EPROM, and EEPROM, magnetic or flash technology or the like. The memory can be used to store data and control instructions, for example, program code, software, microcode or firmware, for monitoring or controlling any devices which are coupled to the computing device and which can be provided for execution or processing by the CPU.

Optionally, the computing device can also provide a means of converting user-specified operating conditions into control signals to control the peripheral devices which can be coupled thereto. In one embodiment, the controller can receive user-specified commands by way of a user interface, for example, a keyboard, a touchpad, a touch screen, a console, a visual or acoustic input device and so forth as is well known to those skilled in this art.

The computing device is configured with an adaptive control method which can evaluate voltages which are required in order to generate a desired drive current in each of the groups of one or more light-emitting elements. The adaptive control method controls the computing device which programs the voltage control device to provide the desired voltages to the one or more groups of one or more light-emitting elements. The voltage control device can thus supply the voltages to each of the one or more groups of one or more light-emitting elements.

The computing device is configured to evaluate required voltage levels needed to generate desired drive currents in each of the one or more groups of one or more light-emitting elements.

In one embodiment of the present invention, the evaluation of these required voltage magnitudes can be performed systematically, for example, sequentially for each group. For each group the required voltage magnitude can be determined in a calibration process by comparing the detected current with the desired current. For example, the adaptive control method can instruct the computing device to instruct the voltage control device to increase the applied drive voltage until the detected drive current is about equal to the desired current.

The computing device can be operatively coupled to a memory device. For example, the memory device can be integrated into the computing device or it can be a memory device connected to the computing device via a suitable communication link. In one embodiment, the computing device can store the required voltage magnitudes of previously determined drive voltages in the memory device for subsequent use during operation of the lighting system. The memory device can be configured as an electronically erasable programmable read only memory (EEPROM), electronically programmable read only memory (EPROM), non-volatile random access memory (NVRAM), read-only memory (ROM), programmable read-only memory (PROM), flash memory or any other non-volatile memory for storing data.

In one embodiment, the computing device can further be configured to recalibrate the substantially minimum required voltage magnitudes at predetermined intervals, randomly, or upon request. In this manner, the control apparatus can provide a means for reducing power consumption in the apparatus even upon alteration of performance characteristics of one or more light-emitting elements.

In one embodiment of the present invention, the computing device can be configured to receive instructions from a source outside of the lighting system, for example a user interface or a lighting controller, via a communication port associated therewith. This communication port can be configured to receive and send information in one or more of a plurality of communication protocols for example, DALI RS485, I2C, RS232, Ethernet or other communication protocol as would be readily understood by a worker skilled in the art.

In one embodiment of the present invention, a lighting system comprises one or more groups of one or more light-emitting elements, wherein each of the groups can be configured as a slave component and the control apparatus is configured as the master component which provides instructions to each of the one or more groups for the operation thereof. In this configuration, the master component namely the control apparatus, provides control signals to each of the one or more groups such that these control signals are in a format readable by the group.

In an alternate embodiment of the present invention, each of the one or more groups of one or more light-emitting elements can be configured to receive instructions configured in a RS485, I2C, RS232, DALI, Ethernet or other format of data transmission as would be readily understood by a worker skilled in the art.

In one embodiment of the present invention, the control apparatus and method can be implemented in an embedded system, hardware and firmware, for example. The adaptive control method and apparatus can be used to directly control the forward voltage of one or more light-emitting elements in a serial and/or parallel configuration or it can be used to control the voltage provided to a group of one or more light-emitting elements in a serial and/or parallel configuration.

In embodiments of the present invention the control apparatus and method can be complemented with additional hardware adapters and can be calibrated to work with a variety of different lighting devices, power supplies and other components, which can be modularly or monolithically interconnected to provide a lighting system with expansible functionality.

In one embodiment of the present invention, the control apparatus and method can be implemented in scalable embodiments such that two or more control apparatuses can be interconnected to create a control network with a master controller, for example. The control apparatuses can be designed such that they can be seamlessly interconnected into control networks without requiring hardware or firmware modifications.

Adaptive Control Method

The adaptive control method (ACM) may be implemented in firmware or software and can provide a means for controlling the calibration of a substantially minimum forward voltage for each group of one or more light-emitting elements of the lighting system. The substantially minimum forward voltage for a particular light-emitting element group is the smallest forward voltage that is required to achieve a desired drive current for all of the light-emitting elements within the group. As an example, the desired drive current can be the nominal drive current as specified by manufacturers of the light-emitting elements. The voltage control device controls the voltage supplied to each of the one or more groups of one or more light-emitting elements, and therefore controls the power drawn from a power supply. Each group can be addressable, for example, via separate wiring or through an addressable bus or other type of network topology as is well known in the art.

An initial step includes selecting and addressing a particular group of one or more light-emitting elements and configuring the voltage control device to provide a low voltage to that group. In an iterative process, the voltage control device is configured to provide a controllable voltage to selected one or more of the light-emitting elements within the selected group of one or more light-emitting elements.

The voltage control device subsequently applies a predetermined initial voltage to the selected group and the control apparatus evaluates the drive current through the group for a predetermined duration, continuously or on an ongoing basis, for example. The control apparatus compares the so evaluated drive current with a predetermined desired drive current value for that group. If the drive current is greater or smaller than the desired drive current value by more than a predetermined amount, the control apparatus subsequently increases or decreases the applied voltage by a predetermined value and re-evaluates the drive current in an iterative manner. The control apparatus can adjust the applied voltage iteratively by any combination of one or more conditions, for example, based on the iteration step, based on the deviation of the evaluated drive current from the desired drive current value and/or the type of light-emitting elements in the group. The iterative process can subsequently be performed for each of the other light-emitting elements within the selected group.

Subsequently, the control apparatus commences the same process for the next group of one or more light-emitting elements.

It is noted that the way by which the applied voltage is being changed during the calibration process, can be performed in a number of different ways, for example, by simply incrementing or decrementing the applied voltage by predetermined equal or progressive amounts, or by interval nesting upon choosing an initial voltage. Interval nesting can comprise changing the applied voltage to a new value between the applied voltage and another value which is either higher or lower than the applied voltage and which can be chosen in predetermined ways depending on, for example, the previously applied voltages, or the types of light-emitting elements. The so established required voltages can be saved in memory.

In one embodiment of the present invention, the control apparatus and method can intermittently, frequently or on-demand re-calibrate the required voltages to compensate for changing voltage requirements of the light-emitting elements, for example, due to aging, in order to maintain the desired drive currents and desired light output for each of the one or more groups of one or more light-emitting elements and further to control power losses within the lighting system. In another embodiment, the control apparatus can automatically calibrate the voltage requirement upon the replacement or addition of one or more light-emitting elements.

The invention will now be described with reference to specific examples. It will be understood that the following examples are intended to describe embodiments of the invention and are not intended to limit the invention in any way.

EXAMPLES

Example 1

Apparatus Architecture

FIG. 1 illustrates the architecture of the control apparatus for a lighting system according to one embodiment of the present invention. The control apparatus has a predetermined number of light-emitting element channels (CHANy—with y being the number of the channel) and a predetermined number of groups of one or more light-emitting elements (GRx—with x being the number of the group). Different channels can comprise different numbers of light-emitting elements and for example a particular group of light-emitting elements can comprise multiple light-emitting elements identified by multiple channels. The nominal colour or brightness of light-emitting elements in different channels or even per channel can be the same or can be different. The control apparatus of the lighting system can independently control up to the predetermined number of light-emitting element channels per each group of one or more light-emitting elements. The control apparatus comprises a central processing unit (CPU) 110, a current sensing circuit (CSC) 120, a voltage control circuit (VCC) 130, and a channel selection circuit (CHSC) 140. The control apparatus can be attached to one or more groups of light-emitting elements comprising one or more channels. Each channel can comprise light-emitting elements of the same nominal colour. The control apparatus provides a power supply voltage control circuit (PSVC) 155 for controlling the output voltage of a power supply 150. The control apparatus can set the light-emitting element drive currents per channel according to the type of light-emitting elements in the channel.

In one embodiment of the present invention the CPU comprises two microprocessors 112 and 114 which are interconnected into a multi-master architecture via I2C and RS485 serial bus systems and interfaces 118 and 119. Each microprocessor can have its own memory and optionally can share common memory 117 with the other microprocessor.

The CPU can receive and transmit data at a programmable speed in digital format via the serial RS485 interface 111. The CPU processes and converts the input data into a stream of suitably formatted instructions for compatibly controlling the VCC 130 and CHSC 140.

The multi-master architecture is implemented using a multi-master protocol for communication between the two microprocessors via the serial I2C bus system. The speed of the communication along the I2C bus system can be programmable. The CPU processes instructions in accordance with the adaptive control method, for example, to determine each minimum forward voltage which is required at the respective light-emitting element channel in order to obtain a desired light-emitting element drive current. The CPU receives current sensing signals from the CSC 120 and sends instructions to the VCC 130 to provide the minimum forward voltages. The VCC comprises voltage control subsystems (VCCx— with x being the number of the subsystem) for each light-emitting element group and can convert digital input signals into analog output signals. The VCC 130 receives the addresses and commands from the CPU 110 and processes these commands and provides respective output voltage levels for each light-emitting element group as defined by the received addresses.

The VCC can include volatile or non-volatile memory in which addresses and commands can be stored.

The PSVC 155 is a digital to analog conversion system that can receive data in digital format from the CPU 110 and can provide this information to a programmable power supply, for example, it can convert the information into an analog signal for application to an error amplifier of a voltage regulator of the power supply. Consequently, the output voltage of the power supply PS 150 can be adjusted through the PSVC 155. The PSVC 155 provides power via the CSC 120 to the VCC 130.

The CSC 120 is part of the current feedback loop and can convert each light-emitting element group drive current into an analog signal which is representative of that drive current. Each analog signal can be transformed to fit a predetermined range of magnitudes and further analog-digital converted and processed. As illustrated, the analog-digital conversion can take place in the CPU 110 or alternatively in a separate device (not illustrated). The CSC 120 can optionally provide information about the light-emitting element group voltages.

The CHSC 140 is a digital circuit and can enable or disable channels in light-emitting element groups according to received CPU instructions. The CHSC comprises one channel-selection circuit (EN GRx) per light-emitting element group (GRx). The CHSC can be accessed by any CPU microprocessor 112 or 114.

Adaptive Control Method

Figure 2A:
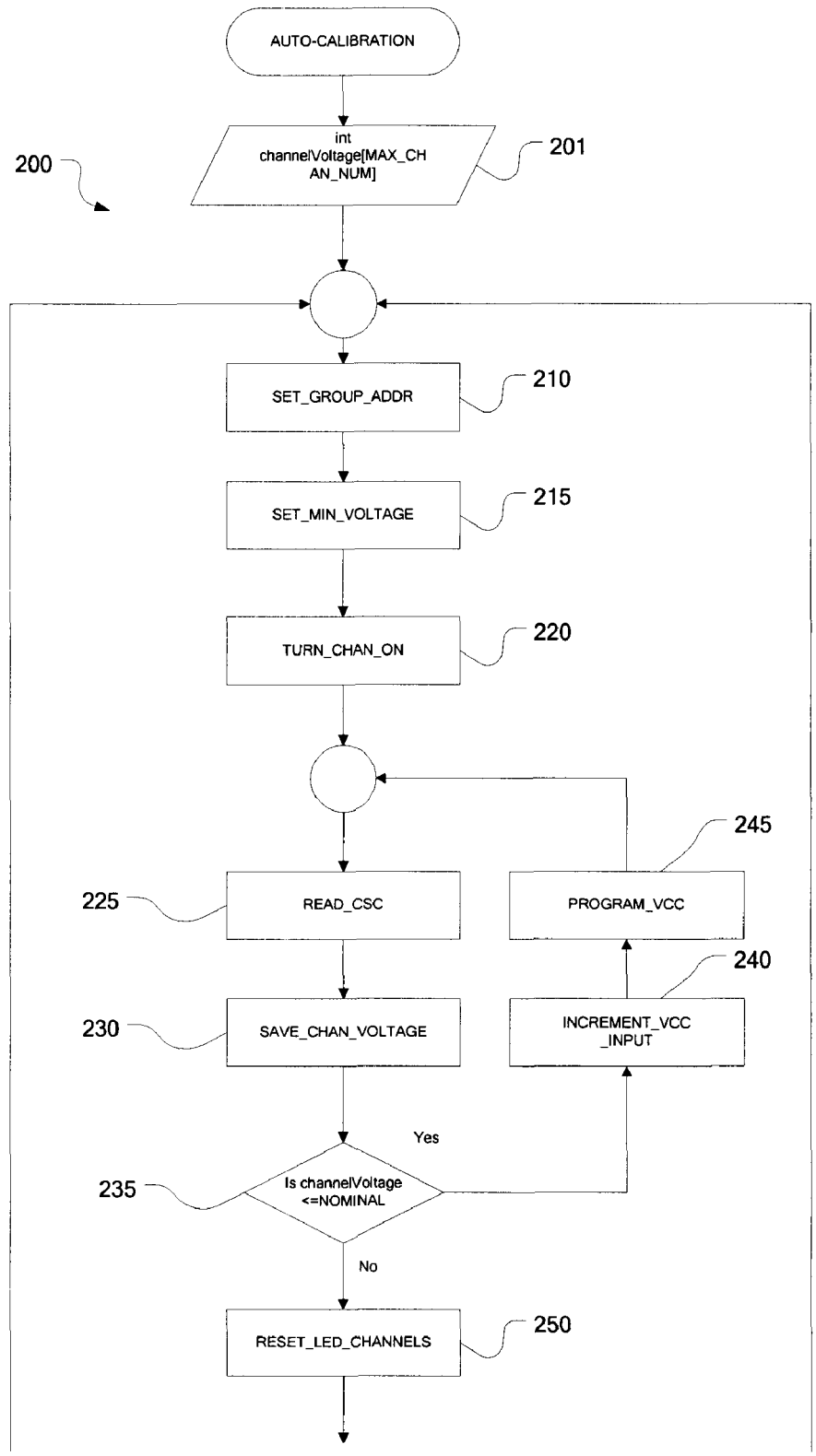
FIG. 2A illustrates a first portion of a flow chart defining a forward voltage auto-calibration method according to one embodiment of the present invention.
Figure 2B:
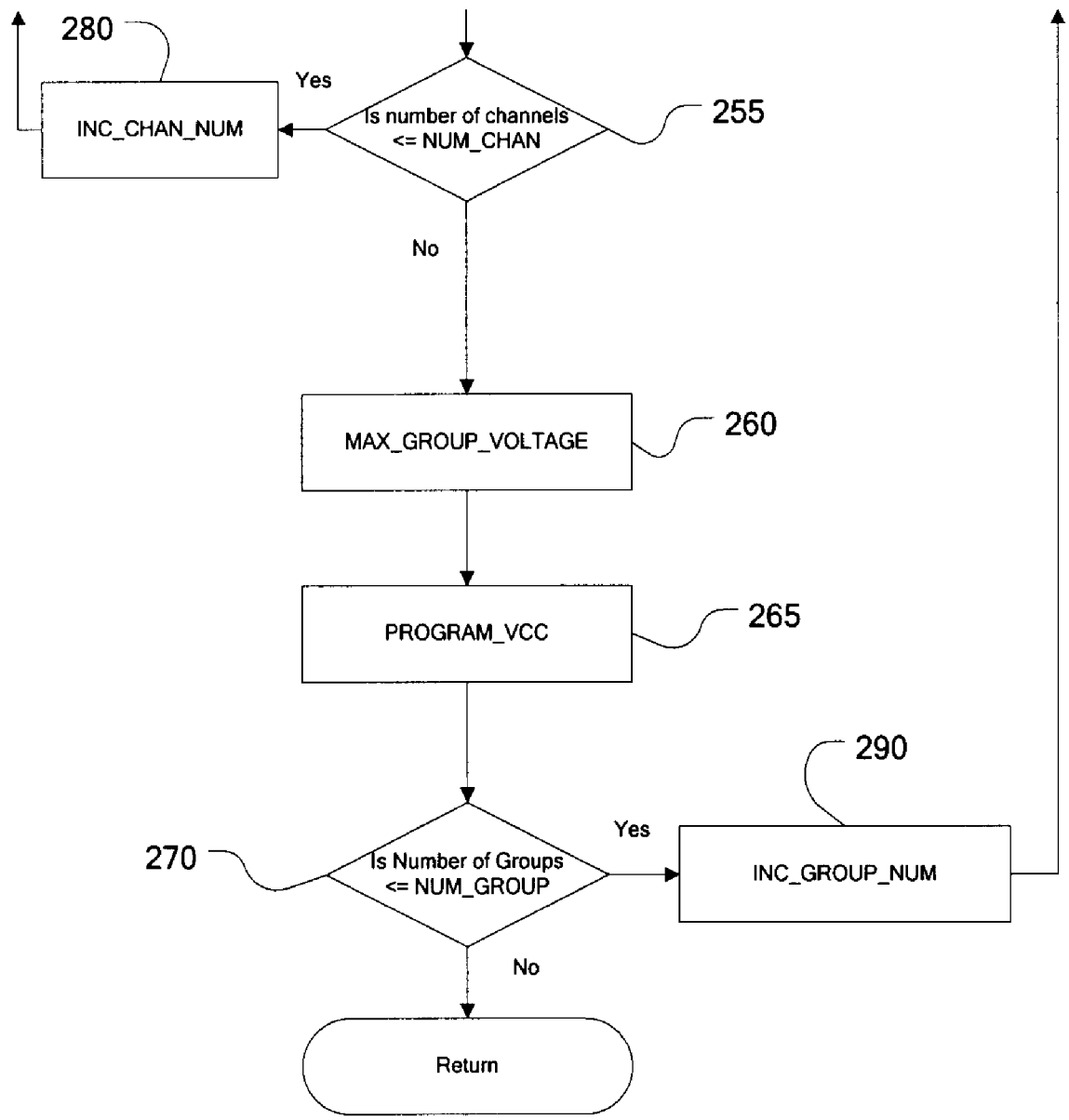
FIG. 2B illustrates the second portion of the flow chart defining the forward voltage auto-calibration method of FIG. 2A.

The ACM comprises an auto-calibration method. A flow chart of the auto-calibration method according to an embodiment of the present invention is illustrated in FIGS. 2A and 2B, wherein each figure illustrates a portion of the flow chart. The ACM can be implemented in firmware and can control, among other aspects, the auto-calibration of the minimum forward voltages per light-emitting element group or channel in the adaptive control system. The minimum forward voltage per light-emitting element channel is the smallest forward voltage that is required to achieve a desired drive current for all light-emitting elements assigned to that light-emitting element channel. The desired drive current can be the nominal drive current as specified in respective light-emitting element data sheets supplied by the manufacturer of the light-emitting elements, for example.

The firmware comprises int channelVoltage[MAX_CHAN_NUM] 201, a storage object for storing the voltages of each light-emitting element channel, and the following functions:

SET_GROUP_ADDR( ) 210 chooses the proper hardware address of each VCC,

SET_MIN_VOLTAGE( ) 215 sets each VCC to the predetermined low voltage value,

TURN_CHAN_ON(int CHAN) 220 switches channel CHAN to maximum light output,

READ_CSC(int CHAN) 225 reads the value of CSC on channel CHAN,

SAVE_CHAN_VOLTAGE(int CHAN) 230 saves the set voltage into the respective element in channelvoltage[ ] 201, RESET_LED_CHANNELS( ) 250 sets all channels to zero light output, INCREMENT_VCC_INPUT(int CHAN) 240 sends previous value incremented by one to VCC, MAX_GROUP_VOLTAGE( ) 260 determines the highest channel voltage in a LEE group from the entries in channelvoltage[ ] 201 for calibration of the VCC, PROGRAM_VCC(int CHAN) 245 sends a new voltage value for channel CHAN to VCC, INC_CHAN_NUM( ) increments 280 channel number by one, INC_GROUP_NUM( ) increments 290 group number by one.

As illustrated in FIG. 2A and FIG. 2B it is the goal of the ACM to control the VCC which in return controls the light-emitting element channel voltages, and consequently the power drawn from the power supply. In step 210 the CPU chooses the first or the previously assigned group in the VCC and instructs the VCC to initialize that group. Next the ACM provides instructions to provide a low output voltage for that group in step 215. The ACM instructs the CPU to instruct the CSHC to activate the first or a previously assigned channel in the chosen light-emitting element group in step 220. Then the output of the CSC is measured in step 225 and saved in channelvoltage[ ] 201 in step 230. The saved value is compared with a predetermined nominal threshold value, for example, as specified in the respective light-emitting element data sheet, in step 235. If the nominal threshold value is larger, the CPU instructs the VCC to increment the output voltage in step 240 and provide the increased output voltage in step 245. The CSC value is measured, saved and compared to the threshold again in step 225 and the process is repeated in this loop until the nominal threshold value is reached.

Once the threshold is reached the CPU resets all channels to zero light output in step 250. If the maximum number of channels in the chosen light-emitting element group has not been reached in step 255, the CPU instructs the CHSC to select the next channel in step 280 and the foregoing steps of the calibration process are repeated.

Once all channels in a light-emitting element group have been scanned in the described fashion and the required channel voltages have been determined, the maximum magnitude of the saved channel voltages for that group is determined in step 260 and the VCC is calibrated to provide that maximum magnitude of the evaluated voltage requirements for the chosen light-emitting element group in step 265.

If the maximum number of light-emitting element groups has not been reached in step 270 the next group is chosen in step 290 and all foregoing steps of the calibration process are repeated. The CPU processes the auto-calibration routine until all light-emitting element groups have been calibrated.

It is obvious that the foregoing embodiments of the invention are exemplary and can be varied in many ways. Such present or future variations are not to be regarded as a departure from the spirit and scope of the invention, and all such modifications as would be obvious to one skilled in the art are intended to be included within the scope of the following claims.

We claim:

1. An adaptive control apparatus for a solid-state lighting system, the lighting system comprising one or more groups of one or more light-emitting elements, the apparatus comprising:
   a) a voltage control device operatively coupled to the one or more groups of one or more light-emitting elements, the voltage control device configured to provide each group with an independently controllable voltage;
   b) a feedback system operatively coupled to the one or more groups of one or more light-emitting elements, the feedback system configured to detect and generate a signal representative of drive currents through the one or more groups; and
   c) a computing device operatively coupled to the feedback system and configured to receive the signal, the computing device operatively coupled to the voltage control device and configured to control operation of the voltage control device;
   wherein the computing device is configured to adaptively evaluate, based on the signal, a required voltage that causes a desired respective drive current in each of the one or more groups.

2. The adaptive control apparatus according to claim 1, wherein the computing device activates one of the one or more groups at a time.

3. The adaptive control apparatus according to claim 2, wherein the computing device is configured to select the one of the one or more groups.

4. The adaptive control apparatus according to claim 1, wherein the computing device is configured to adaptively evaluate one required voltage at a time.

5. The adaptive control apparatus according to claim 1, wherein the voltage control device comprises a memory device for retaining the required voltage for each group.

6. The adaptive control apparatus according to claim 1, wherein each group comprises one or more parallel channels, each channel comprising one or more light-emitting elements.

7. The adaptive control apparatus according to claim 6, wherein the computing device can activate one of the one or more channels at a time.

8. The adaptive control apparatus according to claim 7, wherein the computing device is configured to select the one of the one or more channels.

9. The adaptive control apparatus according to claim 1, wherein the feedback system comprises a current sensor operatively coupled to the one or more groups for providing the signal.

10. The adaptive control apparatus according to claim 1, wherein the computing device is configured to periodically evaluate each required voltage.

11. The adaptive control apparatus according to claim 1, wherein the computing device is configured to randomly evaluate each required voltage.

12. The adaptive control apparatus according to claim 1, wherein the computing device is configured to evaluate each required voltage on command.

13. The adaptive control apparatus according to claim 1, wherein the computing device evaluates each required voltage using predetermined voltage increments beginning with a predetermined minimum voltage.

14. The adaptive control apparatus according to claim 1, wherein the computing device evaluates each required voltage using interval nesting.

15. A method for determining a voltage that, when applied to a system comprising a group of one or more light-emitting elements, causes a desired drive current in the group, the method comprising the steps of:
   a) evaluating a first voltage;
   b) applying the first voltage to the system;
   c) determining a first drive current;
   d) adaptively evaluating a new first voltage based on a comparison of the first drive current and the desired drive current.

16. The method according to claim 15, wherein the new first voltage is equivalent to the first voltage incremented or decremented by a predetermined magnitude.

17. The method according to claim 15, wherein the new first voltage is determined to be between the first voltage and a second voltage, the second voltage being determined according to a predetermined scheme.

18. The method according to claim 15, wherein the sequence of steps is iteratively repeated until the first drive current and the desired drive current deviate by no more than a predetermined desired magnitude.

* * * * *